(12) United States Patent
Goodson

(10) Patent No.: US 10,466,873 B2
(45) Date of Patent: *Nov. 5, 2019

(54) TECHNIQUES FOR ASYNCHRONOUS RENDERING

(71) Applicant: Facebook, Inc., Menlo Park, CA (US)

(72) Inventor: Scott Goodson, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 472 days.

This patent is subject to a terminal disclaimer.

(21) Appl. No.: 15/400,364

(22) Filed: Jan. 6, 2017

(65) Prior Publication Data

US 2017/0115840 A1 Apr. 27, 2017

Related U.S. Application Data

(63) Continuation of application No. 13/784,460, filed on Mar. 4, 2013, now Pat. No. 9,575,634.

(51) Int. Cl.
| | |
|---|---|
| *G06F 3/0484* | (2013.01) |
| *G06F 9/451* | (2018.01) |
| *G06F 3/0481* | (2013.01) |
| *G06F 3/14* | (2006.01) |
| *G06F 9/445* | (2018.01) |
| *G06F 9/54* | (2006.01) |

(52) U.S. Cl.
CPC .......... *G06F 3/0484* (2013.01); *G06F 3/0481* (2013.01); *G06F 3/14* (2013.01); *G06F 9/44521* (2013.01); *G06F 9/451* (2018.02); *G06F 9/542* (2013.01); *G06F 2209/545* (2013.01)

(58) Field of Classification Search
CPC ....................................... G06F 3/0484
See application file for complete search history.

(56) References Cited

U.S. PATENT DOCUMENTS

| | | | | |
|---|---|---|---|---|
| 7,050,955 | B1 * | 5/2006 | Carmel | G06T 19/00 345/418 |
| 2005/0091576 | A1 * | 4/2005 | Relyea | G06F 9/451 715/211 |
| 2006/0147117 | A1 * | 7/2006 | Wakeam | G06K 9/00402 382/186 |

* cited by examiner

*Primary Examiner* — William L Bashore
*Assistant Examiner* — Nathan K Shrewsbury

(57) ABSTRACT

Techniques for asynchronous rendering are described. An apparatus may comprise a layout component, a view component, and a display component. The layout component may be operative on one or more background threads to receive a plurality of layout objects and to calculate layout parameters for each of the plurality of layout objects. The view component may be operative on a main thread to instantiate a plurality of view objects, wherein a view object is created for and associated with each of the plurality of layout objects. The display component may be operative on the main thread to create a display of a plurality of placeholders, wherein a placeholder is displayed for each of the plurality of view objects according to layout parameters of an associated view object. Other embodiments are described and claimed.

20 Claims, 10 Drawing Sheets

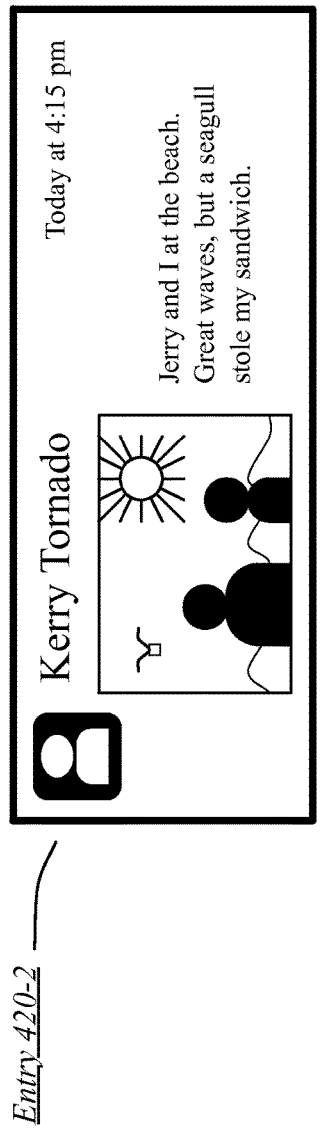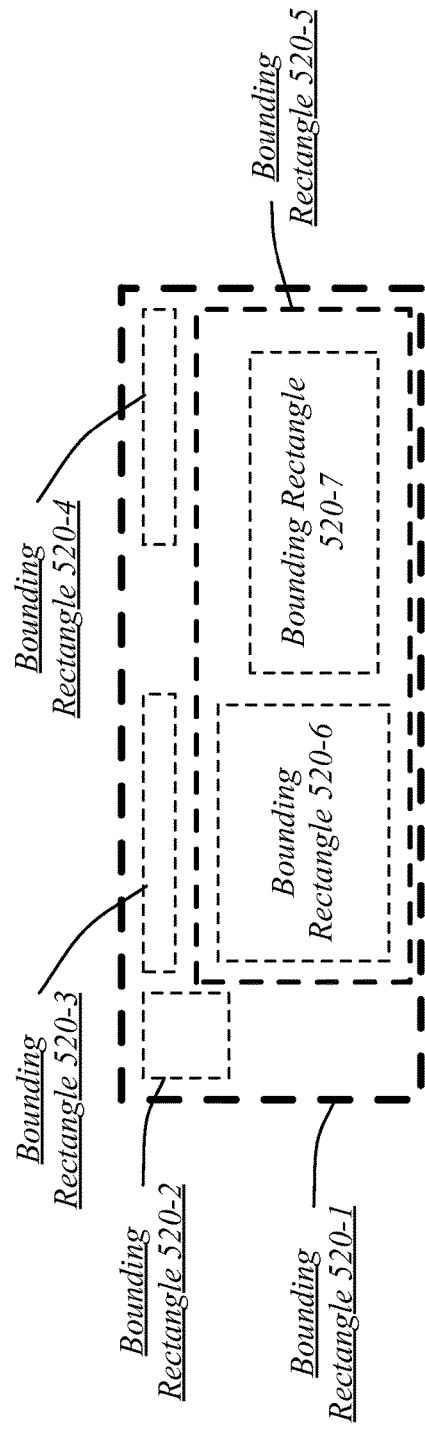
FIG. 5

Centralized System 600

Device 620

Processing Component 630

Processor Circuit 635

Main Thread 150
- View Component 160
- Display Component 170

| Background Thread 110-1 | Background Thread 210-1 |
| --- | --- |
| Layout Component 120 | Render Component 220 |

| Background Thread 110-2 | Background Thread 210-2 |
| --- | --- |
| Layout Component 120 | Render Component 220 |

⋮ ⋮

| Background Thread 110-a | Background Thread 210-b |
| --- | --- |
| Layout Component 120 | Render Component 220 |

Network Thread 350
- Network Component 360

Communications Component 640

Device 610

Signals 614

Media 612

Receive on one or more background threads a plurality of layout objects.
802

Calculate on one or more background threads layout parameters for each of the plurality of layout objects.
804

Instantiate on a main thread a plurality of view objects, wherein a view object is created for and associated with each of the plurality of layout objects.
806

Create on the main thread a display of a plurality of placeholders, wherein a placeholder is displayed for each of the plurality of view objects according to layout parameters of an associated view object.
808

*FIG. 8*

TECHNIQUES FOR ASYNCHRONOUS RENDERING

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for asynchronous rendering of one or more user interface views. Some embodiments are particularly directed to techniques to asynchronously render user interface elements that use an operating system user interface library. In one embodiment, for example, an apparatus may comprise a layout component, a view component, and a display component. The layout component may be operative on one or more background threads to receive a plurality of layout objects and to calculate layout parameters for each of the plurality of layout objects. The view component may be operative on a main thread to instantiate a plurality of view objects, wherein a view object is created for and associated with each of the plurality of layout objects. The display component may be operative on the main thread to create a display of a plurality of placeholders, wherein a placeholder is displayed for each of the plurality of view objects according to layout parameters of an associated view object. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of the operating environment for the display system including a detailed diagram of a user interface element.

FIG. 6 illustrates an embodiment of a centralized system for the system of FIG. 1.

FIG. 8 illustrates an embodiment of a logic flow for the system of FIG. 1.

DETAILED DESCRIPTION

Figure 1:
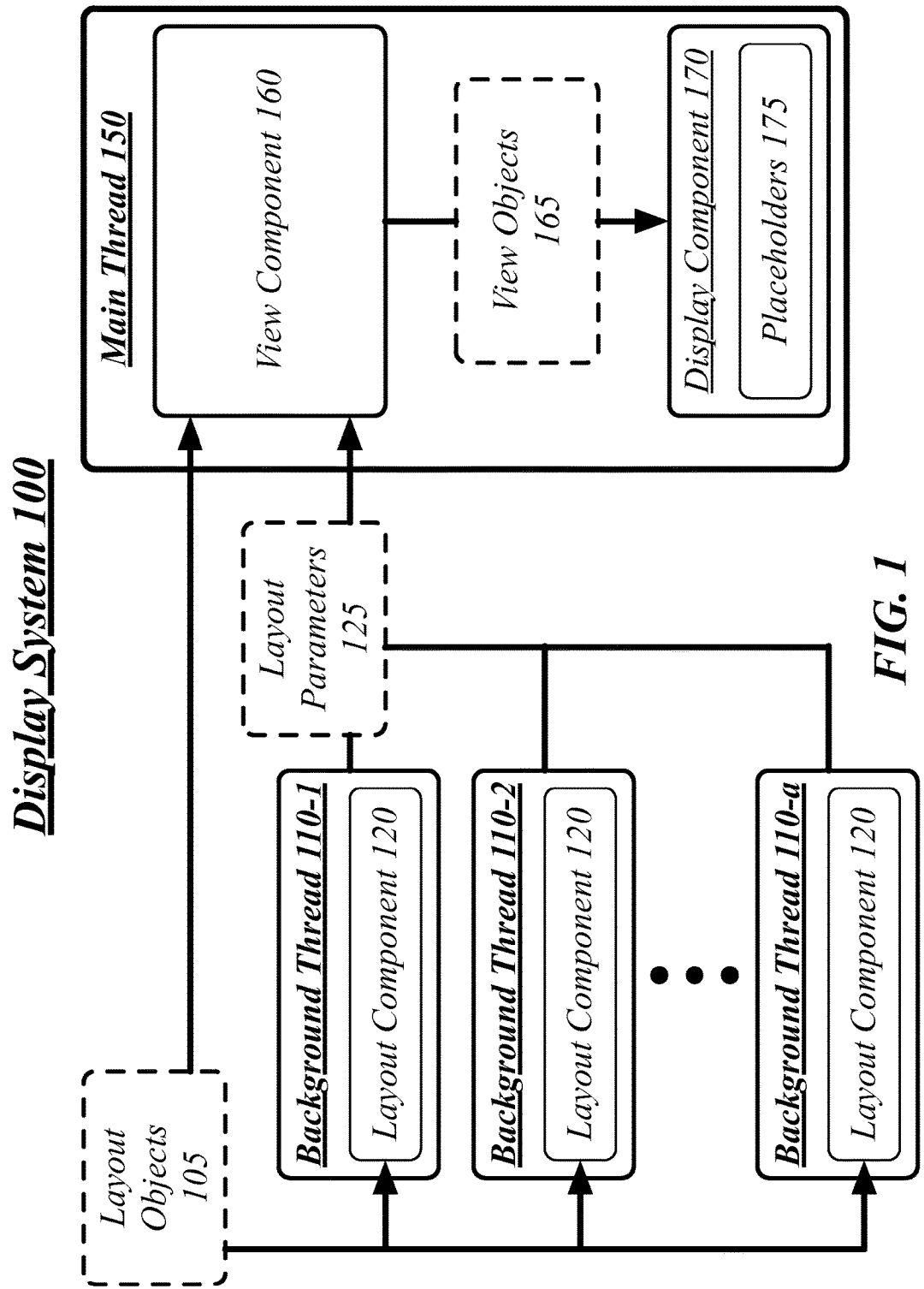
FIG. 1 illustrates an embodiment of a display system.

Various embodiments are generally directed to techniques for asynchronously preparing and rendering user interface elements. Some embodiments are particularly directed to techniques for asynchronously preparing and rendering user interface elements from an operating system user interface library. In one embodiment, the operating system user interface library may necessitate that the user interface elements be instantiated in a main thread of an application.

An application may be programmed to create user interface elements through the instantiation of objects from a user interface library, such as may be provided by an operating system or other system program. These elements may comprise both visual elements visible to a user and non-visible elements used to organize the visual elements. For example, a picture element for presenting a picture, such as a photo, to a user would be considered a visual element. A text element for displaying text, such as a comment for the photo, would be another visual element. The picture element may be created by, or instantiated by, a picture object, whereas the text element may be created by a text object. A commented photo element may then be a non-visible element which associates the picture element to the text element, and may be created as a commented photo object acting as a container for the photo object and text object. The elements may be used to display information to the user or may be used to receive information from a user. For example, one element may display text for a user, while another is available for the user to enter text.

As such, the user interface for an application may comprise a collection of user interface elements created through the instantiation of user interface objects from a user interface library. An operating system may provide the user interface library for use in programming applications for the operating system. However, the library or operating system may place restrictions on how the library may be used. For instance, a restriction may be in place that in a multi-threaded application user interface objects may only be created on the main thread of the application. However, the creation of these objects may involve setting parameters for them dependent on their contents. A display element for a comment photo may include the photo and a text element, each of which must be sized, laid out next to each other, and the total size of that layout calculated. Performing these calculations on a main thread for a large number of user interface elements may use sufficient time as to be noticeable to the user, interrupting their experience. For example, if a user attempts to scroll a user interface during these calculations, that scroll attempt may not be registered, or may be delayed, presenting the user with the appearance of an unresponsive application.

It may therefore be desirable to pre-calculate the layout for user interface elements prior to creating them on the main thread. Particularly, it may be advantageous to perform this pre-calculation on one or more background threads so that the main thread may remain available to receive and respond to user interaction with the application. However, the application must still abide by the restriction on creating and interacting with objects from the user interface library using the main thread. As such, for each user interface object which will be created on the main thread, the application may create a corresponding object using a background thread, the corresponding objects duplicating the hierarchy for the user interface. Each of the corresponding objects may be used to calculate the layout of the user interface object to be created. This will allow the creation and configuration of the user interface object on the main thread to be performed in less time, by basing that creation and configuration off the pre-calculated layout for the corresponding object. Consequently, a user will experience reduced lag and unresponsiveness when using the application. As a result, the embodiments can improve the responsiveness and general user experience for an application.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a display system 100. In one embodiment, the display system 100 may comprise a computer-implemented display system 100 having a software application comprising one or more components. Although the display system 100 shown in FIG. 1 has a limited number of elements in a certain topology, it may be appreciated that the display system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of background threads 110-a may include background threads 110-1, 110-2, 110-3, 110-4 and 110-5. The embodiments are not limited in this context.

The display system 100 may comprise an application running on a plurality of threads. This application may comprise a main thread 150 and one or more background threads 110-a. The application may comprise a layout component 120, a view component 160, and a display component 170. The application may be generally operative to display a user interface comprising a plurality of user interface elements for a user. The application may be generally operative to display the user interface elements by instantiating a plurality of user interface objects from a user interface library, such as may be provided by an operating system.

A thread may comprise a lightweight process. A thread may comprise one of a plurality of lightweight processes executing in parallel as part of a single application program. A thread may comprise a single chain of sequentially executing commands, elements, subroutines, or other programming structures. An application program may instantiate with a single thread, which may therefore be referred to as the main thread 150 of the application. The main thread 150 may have special significance or particular privilege as compared to other threads, such as according to an operating system or library. The main thread 150 of the application program may be operative to create one or more additional threads in order to perform tasks in parallel with the main thread. For example, the additional threads may be used to perform computation for the application program while the main thread 150 primarily waits to receive interrupts from an operating system, such as from user input being received.

The additional threads may be created according to any of the known techniques. For example, the threads may comprise one or more long-term threads maintained over the life of a particular run of the application program, the long-term threads waking to perform calculations when passed tasks from the main thread or other threads. The threads may comprise one or more short-term threads instantiated for the performance of a particular task and then deallocated when their respective task is complete. For instance, the main thread 150 or another thread may define a contained task—such as a function, procedure call, or other programming element combined with one or more objects, data structures, or other data containers—and submit the task to a centralized operating system clearinghouse for the execution of lightweight tasks, wherein the clearinghouse queues, executes the task using a thread, and returns the result to the submitting thread.

The layout component 120 running on a plurality of background threads 110-a may correspond to the processes of the layout component 120 being run in parallel on a plurality of background threads 110-a. For instance, the layout component 120 may comprise one or more procedures or functions, the plurality of background threads 110-a each carrying out the procedures or functions as consistent with the processes of the layout component 120.

Instantiating an object may comprise any one of the known techniques for creating an object. The technique for instantiating an object may vary according to the operating system and may vary according to a programming language used. For example, in some programming language instantiating an object may comprise making a call to a library function that creates the object, the object returned as a variable in the programming language. An object may comprise any of the known techniques for objects, such as a programming language construct which bundles together data and procedures for interacting with the data.

The display system 100 may comprise a layout component 120. The layout component 120 may be operative on one or more background threads 110-a to receive a plurality of layout objects 105 and to calculate layout parameters 125 for each of the plurality of layout objects 105. The background threads 110-a may comprise threads particularly created for performing calculations of the layout of user interface elements for an application.

The plurality of layout objects 105 may comprise instantiations of one or more user interface helper classes from a user interface helper library. For instance, if the user interface library provided by an operating system limits the instantiation of objects from the user interface library to the main thread 150, the user interface helper library may provide classes, procedures, functions, constants, variables, and other programming elements to assist in the management and creation of objects from the user interface library.

The user interface helper library may be operative to assist in using the user interface library by providing a set of classes that correspond on a one-to-one basis to the classes of the user interface library. For each class in the user interface library that represents a user interface element there may be a corresponding helper class in the user interface helper library, wherein the corresponding helper class is a container class operative to contain an instantiation of a corresponding object from the user interface library. As such, a helper objects instantiated from a helper class may initially contain a NULL variable or other non-instantiated variable of the type of the corresponding class from the user interface library, the non-instantiated variable available to store or store a reference to an object from the user interface library instantiated on the main thread. As such, a helper object from the user interface helper library may first contain layout information which will be used in the creation of a corresponding object from the user interface library and then later also contain the corresponding object itself.

The layout parameters 125 may comprise information for use in displaying the layout objects 105. A set of layout parameters 125 may be calculated for each of the plurality of layout objects 105, such that each of the plurality of layout objects 105 has associated with it a set of layout parameters 125. The layout parameters 125 for a layout object may comprise the external dimensions of the user interface element represent by the layout object and any parameters used for an internal layout of the user interface element. For example, if a layout object represents a box of text for display, the received layout object may merely contain the text to be displayed, one or more identifiers indicating that the layout object is a text box, and one or more formatting options for the text. The layout parameters 125 for that object may therefore comprise a bounding rectangle for the text box determined according to an amount of space used to display the text, and coordinates internal to the bounding rectangle indicating the positioning of the text within the bounding rectangle. Calculating the layout parameters 125 for a layout object may comprise determining a relative positioning of the user interface element(s) of the layout object and determining an amount of space used for the display of those user interface element(s), thereby determining the information for use in positioning the user interface element(s) for display within itself and relative to other user interface elements.

In different embodiments the various described elements may be organized according to a variety of different techniques. In some embodiments, the layout parameters 125 for each of the plurality of layout objects 105 may be encapsulated within the corresponding layout object such as through being one or more parameters, variables, structures, or other elements of the layout object itself, such as may be defined in a class for the layout object. Similarly, the layout component 120 running on a plurality of background threads 110-a may comprise a procedure, function, or other execution element which may be encapsulated within the corresponding layout object such as through being defined in a class for the layout object. Alternatively, the layout parameters 125 may be stored distinctly from the layout objects 105, such as by using a table, database, or other storage technique. Similarly, the layout component 120 may also be stored separately, such as in a library.

The display system 100 may comprise a view component 160. The view component 160 may be operative on a main thread 150 to instantiate a plurality of view objects 165, wherein a view object is created for and associated with each of the plurality of layout objects 105. The main thread 150 may comprise the initial thread of an application program. The main thread 150 may comprise a unique thread in the application program, the main thread 150 the only thread authorized by an operating system or user interface library for the creation of view objects 165. As such, the main thread 150 may be the only thread operative to create the view objects 165.

The creation of the view objects 165 may involve specifying display parameters for the view objects 165. The display parameters may include the internal and external specifications for the layout of the view objects 165. For instance, for a particular view object the display parameters may comprise the positioning of internal features of the view object, such as the position and size of text within the object, and may comprise the size of the user interface element represented by the view object. The display parameters may correspond on a one-to-one basis to the layout parameters 125. The layout parameters 125 may generally comprise the display parameters, such that the view component 160 reads the layout parameters 125 and copies them to the display parameters in the creation of the view objects 165.

In some embodiments, each of the plurality of view objects 165 may be an instantiation of one or more classes from a user interface library. In some embodiments, the user interface library may comprise an operating system user interface library. A user interface library may comprise a collection of classes, functions, procedures, constants, variables, and other programming elements collected for the purpose of creating user interfaces. The user interface library may be included as one of a number of techniques included with or provided with an operating system. The use of a user interface library with an application program may comprise a hard link to the library, a soft link to the library, or any other technique for using a library.

A class may comprise an object-oriented programming construct combining together structured data storage and functions or procedures for use in manipulating the structured data and performing tasks using the structured data. For example, a user interface library may provide one or more classes, wherein each class represents a particular type of user interface element. For instance, one class may represent a display of formatted text, while another class may represent a radio button dialog. The formatted text class may comprise one or more variables that can be set to specify the text string to be displayed, the formatting of the text string, and the total size of the text display element, such as a bounding rectangle. The radio button dialog class may comprise one or more variables indicating the number of radio button options, text of the radio button options, and a total size of the radio button dialog, such as a bounding rectangle.

It will be appreciated that in different embodiments, such as in different programming language or on different operating systems, that the scope of the classes may be different. For instance, some user interface libraries may represent every different type of dialog as a distinct class. Some user interface libraries may represent every different type of dialog as a distinct subclass of a general dialog class. Some user interface libraries may represent every different type of dialog with a single class, the different types of dialog distinguished according to the variables of objects instantiated from the class. Any of these or other techniques may be used in accordance with the enclosed embodiments.

The display system 100 may comprise a display component 170. The display component 170 may be operative on the main thread 150 to create a display of a plurality of placeholders 175, wherein a placeholder is displayed for each of the plurality of view objects 165 according to layout parameters 125 of an associated view object. Creating a display may comprise commanding a display device via an operating system and user interface library. The placeholders may comprise graphics of the same dimensions as their corresponding view object so that once the corresponding view object is ready for display the placeholder can be removed and replaced with display of the view object. As such, the placeholder holds the place of the view object in a user interface display so that the user interface display can maintain its layout without adjustment when the asynchronous display of the view object replaces the display of the placeholder. As such, the placeholders are displayed synchronously upon the creation of the view objects, before their real contents have necessarily finished rendering.

Figure 2:
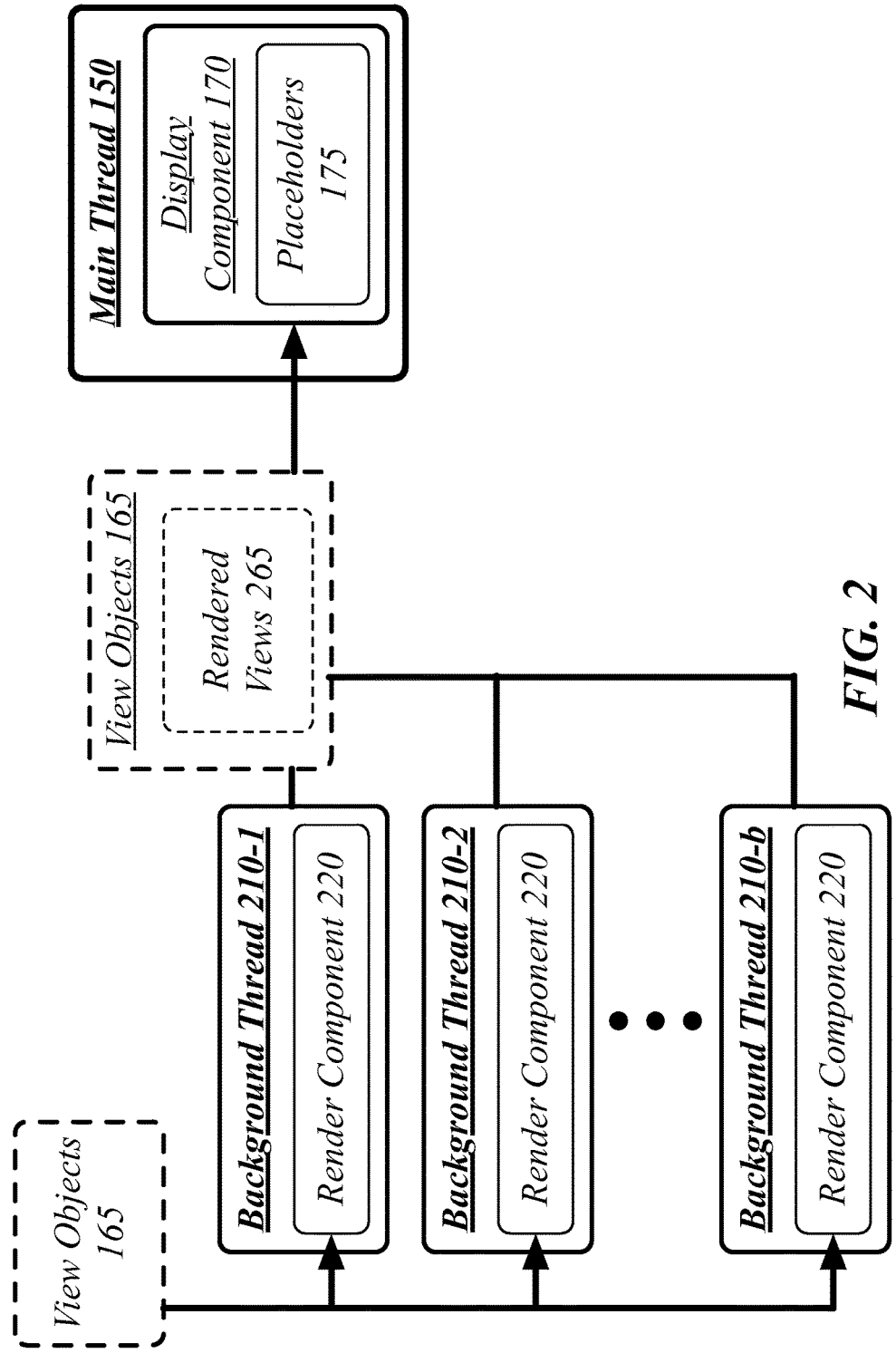
FIG. 2 illustrates an embodiment of the display system including a render component.

FIG. 2 illustrates a second embodiment of a display system 100 including a render component 220 running on one or more background threads 210-b.

The render component 220 may be operative on one or more background threads 210-b to render the plurality of view objects 165. Rendering the view objects 165 may produce rendered views 265, wherein each of the rendered views 265 corresponds to one of the placeholders 175, the rendered views 265 to replace the placeholders 175.

Rendering the view objects 165 may comprise making one or more procedure calls on the view objects 165, such as to a user interface library. For instance, each view object may have associated with it, such as for a class for the object, a procedure for rendering the object. The view object may be rendered to a buffer, the buffers for each view object corresponding to the rendered views 165 for the view objects 165.

The display component 170 may be operative to replace the display of the plurality of placeholders 175 with a display of the plurality of view objects 165 once the plurality of view objects 165 is rendered. This replacement may comprise displaying the rendered views 265 in the positions corresponding to the placeholders 175. This replacement may comprise indicating to the operating system or user interface library that image buffers corresponding to the rendered views 265 should replace the placeholders 165 for display.

In some embodiments, the render component 220 may be operative to determine that one or more of the plurality of view objects 165 has changed and to re-render the one or more of the plurality of view objects 165. This re-rendering may comprise substantially the same process as rendering the view objects 165 initially, taking into account one or more modified values of the one or more of the plurality of view objects 165. The display component 170 may be operative to replace the display of the one or more of the plurality of view objects 165 with the re-render of the one or more of the plurality of view objects 165.

The one or more background threads 210-b may be the same group of threads as background threads 110-a. Alternatively, the one or more background threads 210-b may be a different group of threads than background threads 110-a. For instance, if an application program maintains a group of background threads 110-a for use in performing background calculations, the group of background threads 110-a reused to perform different background calculation tasks, the same group of background threads 110-a may be used as background threads 210-b. However, if an application creates or has created task-specific threads—such as by using an operating central clearinghouse for performing background calculations—then the plurality of background threads 110-a may comprise an entirely different group of threads than the plurality of background threads 210-b.

The render component 220 running on a plurality of background threads 210-b may correspond to the processes of the render component 220 being run in parallel on a plurality of background threads 210-b. For instance, the render component 220 may comprise one or more procedures or functions, the plurality of background threads 210-b each carrying out the procedures or functions as consistent with the processes of the render component 220.

In different embodiments the various described elements may be organized according to a variety of different techniques. In some embodiments, the rendered views 265 may be encapsulated within the corresponding view object such as through being one or more parameters, variables, structures, or other elements of the view object itself, such as may be defined in a class for the view object. For instance, each view object of the plurality of view objects 165 may contain a buffer for the storage of a rendered view. Alternatively, the rendered views 265 may be encapsulated within the corresponding layout object such as through being one or more parameters, variables, structures, or other elements of the layout object itself, such as may be defined in a class for the layout object, such as by each layout object of the plurality of layout objects 155 containing a buffer for the storage of a rendered view. Prior to rendering the view for a view object, the buffer for a view object or layout object may be empty. Rendering the view object may therefore comprise populating a buffer with a rendered view of the view object. Similarly, the render component 220 running on one or more background threads 210-b may comprise a procedure, function, or other execution element which may be encapsulated within the corresponding view object or layout object such as through being defined in a class for the view object or layout object. Alternatively, the rendered views 265 may be stored distinctly from the view objects 165 and layout objects 105, such as by using a table, database, or other storage technique. Similarly, the render component 220 may also be stored separately, such as in a library.

Figure 3:
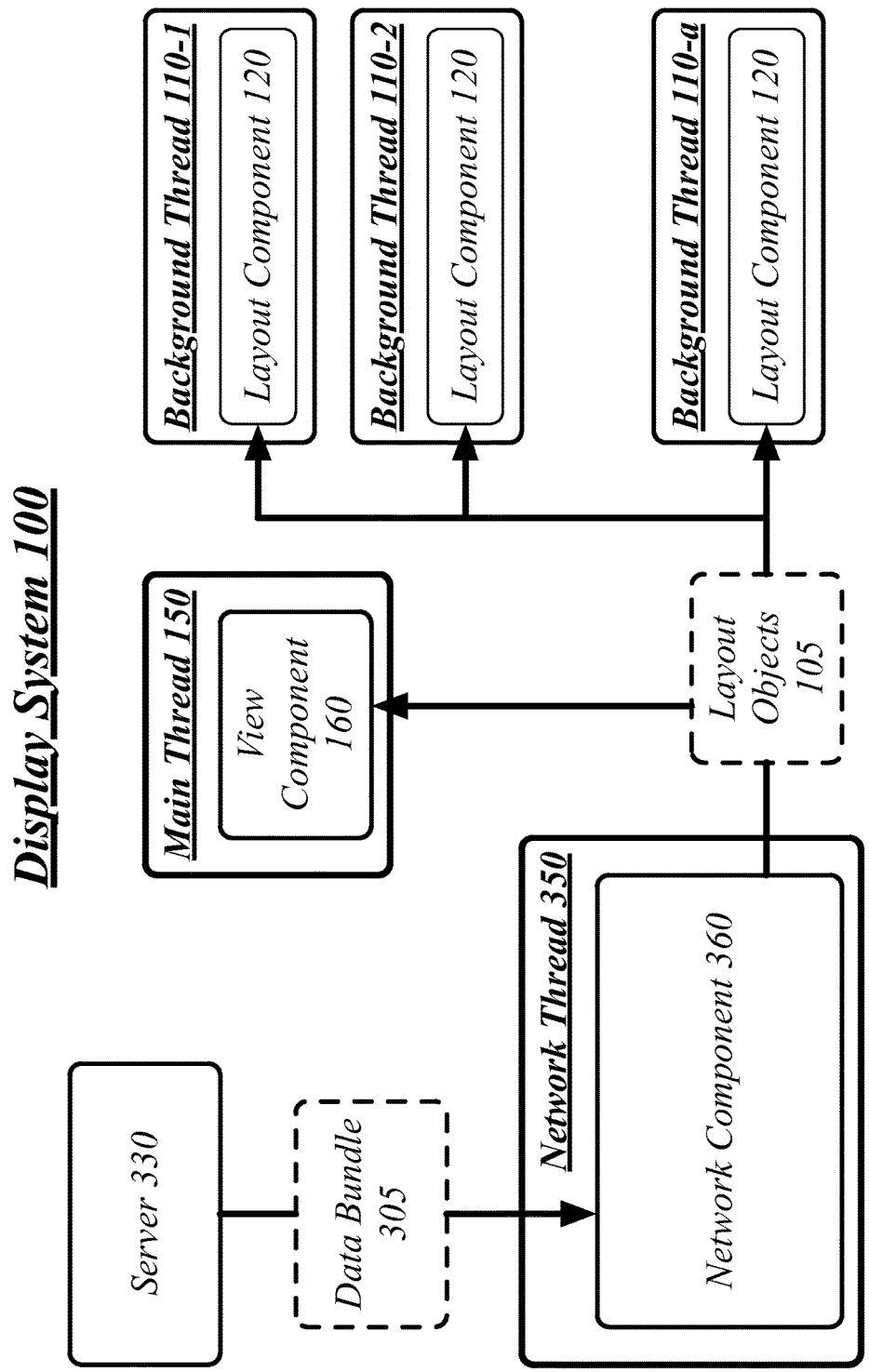
FIG. 3 illustrates an embodiment of the display system including a network component.

FIG. 3 illustrates a third embodiment of display system including a network component 360 running on a network thread 350.

The network component 360 may be operative on a network thread 350 to receive a data bundle 305 from a server 330, to produce the plurality of layout objects 105 based on the data bundle 305, and to send the plurality of layout objects 105 to the layout component. The network thread 350 may comprise a thread distinct from the main thread 150 and background threads 110-a and 210-b. The network thread 350 may comprise a thread used by an application program to handle network tasks, such as receiving or sending information over a network, including exchanging information with server 330. The network thread 350 may be a persistent thread created as part of the initiation of the application program for handling network activity.

The server 330 may comprise a web server, data repository, web service, Internet service, or any other network-accessible server operative to transmit the data bundle 305 to the network component 360. The server 330 may comprise a server for a social networking service, the server 330 operative to transmit social networking information to the network component 360. The data bundle 305 may comprise a collection of social networking information from a social networking service for display to a subscriber of the social networking service. For instance, the network component 360 may be operative to request a set of social networking updates from the social networking service, to request a profile from the social networking service, or to request any other form of social networking information. The data bundle 305 may comprise the response to such a request.

The data bundle 305 may comprise a stream, bundle, array, or other container of data. The data bundle 305 may comprise a JavaScript Object Notation (JSON) document, a Hypertext Markup Language (HTML) document, an Extensible Markup Language (XML) document, or any other form of document. The data bundle 305 may comprise a stream, bundle, array, or other container of objects wherein each object represents a user interface element. In general, the data bundle 305 may comprise any technique for encoding a plurality of objects.

Transforming the data bundle 305 into the layout objects 105 may comprise unpacking a sequence of objects, such as a sequence of JSON objects, into layout objects 105. For instance, a layout object may be created for each object stored in data bundle 305. However, in some instances, the object breakdown used for data bundle 305 may not correspond precisely to the object breakdown used for layout objects 105, such as the classes of a user interface helper library. As such, the network component 360 may be operative to translate the data bundle 305 into a user interface object structure used by the user interface helper library. For example, the data bundle 305 may use a uniform format on different platforms, while the user interface helper library may be platform-specific so as to correspond to a platform-specific user interface library, such as one provided as part of an operating system.

Figure 4:
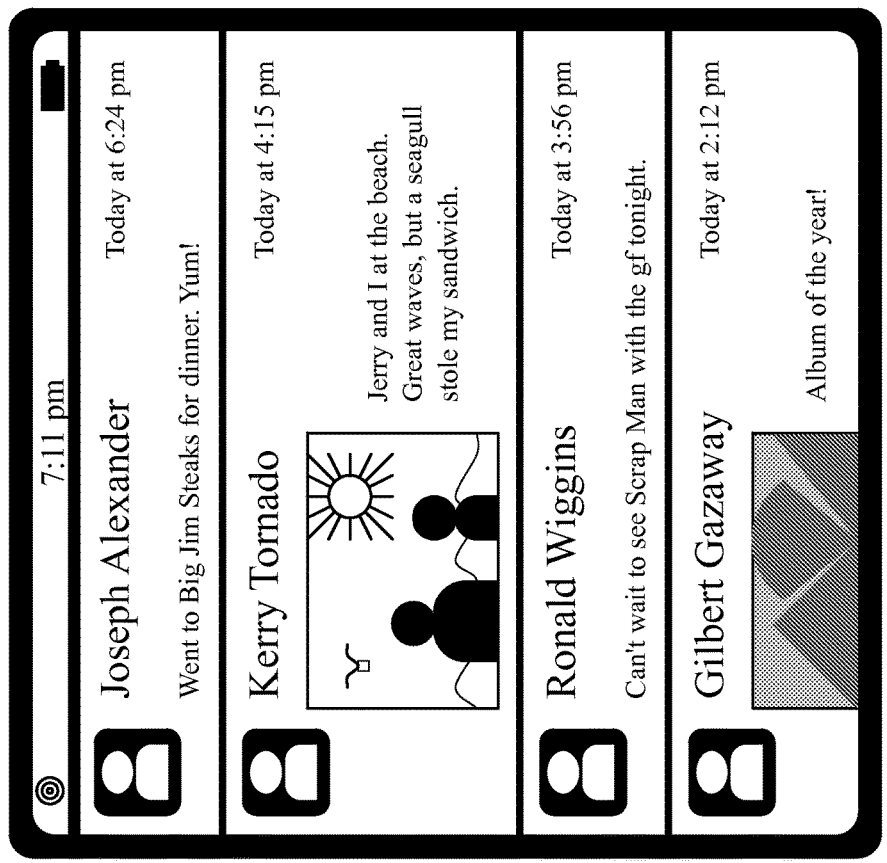
FIG. 4 illustrates an embodiment of an operating environment for the display system.

FIG. 4 illustrates an embodiment of an operating environment 400 for the display system 100. As shown in FIG. 4, a device 410 is displaying an application program for a user.

Device 410 may comprise a user device such as a smartphone, cell phone, portable digital assistant (PDA), or any other form of electronic device. The device 410 may be operative to execute one or more applications on behalf of a user, including first-party applications, third-party applications, application provided with the device 410, and applications installed by one or more users of the device 410.

As shown in FIG. 4, the application running on device 410 may comprise an application for a social networking service displaying updates from the social networking service. The updates may comprise four entries: entry 420-1 regarding a friend going to dinner, entry 420-2 regarding a friend posting a commented picture of their trip to the beach, entry 420-3 regarding a friend posting about going to a concert, and entry 420-4 regarding a friend posting that they like a particular music album with an associated comment.

Each of the entries may correspond to an element received from a server 330 as part of a data bundle 305. Each of the entries may comprise a user interface element. One, more than one, or all of the entries may comprise multiple user interface elements. Each entry may comprise a user interface element, wherein that user interface element comprises one or more sub-elements.

FIG. 5 illustrates an embodiment of the operating environment 400 for the display system 100 including a detailed diagram of a particular user interface element.

With reference to FIG. 4, entry 420-2 is shown separate from the other entries for the purposes of illustration. Entry 420-2 may be composed of a plurality of user interface elements each with an associated bounding rectangle. For example, as depicted, entry 420-2 as a whole has associated with it bounding rectangle 520-1, bounding rectangle 520-1 being the outline for the display of entry 420-2. Within that, the beach photo has bounding rectangle 520-6 being the outline of the photo. Similarly, entry 420-2 has a profile picture with bounding rectangle 520-2, a profile name with bounding rectangle 520-3, a time associated with the social networking update with bounding rectangle 520-4, a comment on the photo with bounding rectangle 520-7, and a combined commented photo element comprising both the photo and the comment with bounding rectangle 520-5.

As such, in some embodiments, the layout parameters 125 for a layout object may include a bounding rectangle for the layout object, the display component 170 operative to size a placeholder for a view object according to the bounding rectangle from the layout parameters 125 of the layout object. The display on device 410 may be initially created with the various entries blank but properly sized for the content to eventually be displayed in them. A bounding rectangle may be stored using any of the known techniques for storing a bounding rectangle, such as a height and width pair, a pair of coordinates for opposing corners, the coordinates for each of the four coordinates of the rectangles, or according to any other geometric or spatial metric.

In some embodiments, the plurality of layout objects 105 may comprise a hierarchy of layout objects 105, the layout component 120 operative to recursively calculate the layout parameters 125 for each of the plurality of layout objects 105 according to the hierarchy of layout objects 105. For instance, a layout object for a picture with associated text may correspond to the commented beach photo of entry 420-2. Each of the photo and the comment may themselves be instantiated as a layout object, the photo object and comment object contained by the picture-with-text object, with them both therefore being children of the picture-with-text object. As shown in FIG. 5, this picture-with-text object may itself be a child object of an object corresponding to the entirety of entry 420-2, the object for entry 420-2 also having child objects in the hierarchy for the profile picture, profile name, and post time. In some embodiments, a root object for the hierarchy may comprise an object corresponding to the entirety of the user interface for an application, such as all of entries 420-1, 420-2, 420-3, 420-4, and any other entries.

If the plurality of layout objects 105 comprise a hierarchy, then the bounding rectangles for the layout objects 105 may be calculated recursively. For example, the size and shape of the bounding rectangle 520-5 for the commented photo is dependent on the size and shape of bounding rectangles 520-6 and 520-7 and the relative positioning of bounding rectangles 520-6 and 520-7. As such, the layout component 120 may be operative to calculate the layout parameters 125 including the bounding rectangles in a bottom-to-top manner in the hierarchy, calculating the layout parameters 125 for leaves of the hierarchy first and then upwards through the hierarchy to the root of the hierarchy, with the layout parameters 125 for the entire interface calculated once they've been calculated for the root. For example, a task may be queued for each of the layout objects 105 to calculate the layout parameters 125, with the task for a layout object with children operative to stall, halt, or otherwise wait until the layout parameters 125 have been calculated for the children.

In some embodiments, the plurality of placeholders 125 may comprise rendered images of a plurality of user interface controls, the plurality of user interface controls corresponding to the plurality of view objects 165. For instance, the layout component 120 may be operative to render a placeholder image for each layout object and use the placeholder image instead of an empty or blank placeholder. The display component 170 may be operative to dynamically switch out a placeholder image when the corresponding user interface control is selected, where the placeholder image is replaced by the user interface control. For instance, if a layout object corresponds to a text-entry box, an image of the text-entry box may be displayed and when the text-entry box is selected, the view component 160 instantiates a view object for the text-entry box and the display component 170 replaces the image with an actual text-entry box operative to receive text from a user.

FIG. 6 illustrates a block diagram of a centralized system 600. The centralized system 600 may implement some or all of the structure and/or operations for the display system 100 in a single computing entity, such as entirely within a single device 620.

The device 620 may comprise any electronic device capable of receiving, processing, and sending information for the display system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 620 may execute processing operations or logic for the display system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 620 may execute communications operations or logic for the display system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612, 642 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 620 may communicate with other device 610 over a communications media 612 using communications signals 614 via the communications component 640. The device 610 may be internal or external to the device 620 as desired for a given implementation. Device 610 may comprise, for example, server 330, such that signals 614 sent over media 612 comprise the reception of data bundle 305 from device 610.

As shown in FIG. 6, the device 620 comprises a processor circuit 630 executing the layout component 120, the view component 160, the display component 170, the render component 220, and the network component 360 on a plurality of threads. The processor circuit 630 may comprise a single-processor processor circuit, a multiple-processor processor circuit, a single-core processor circuit, a multiple-core processor circuit, or any other form of processor circuit operative to execute a plurality of threads.

Figure 7:
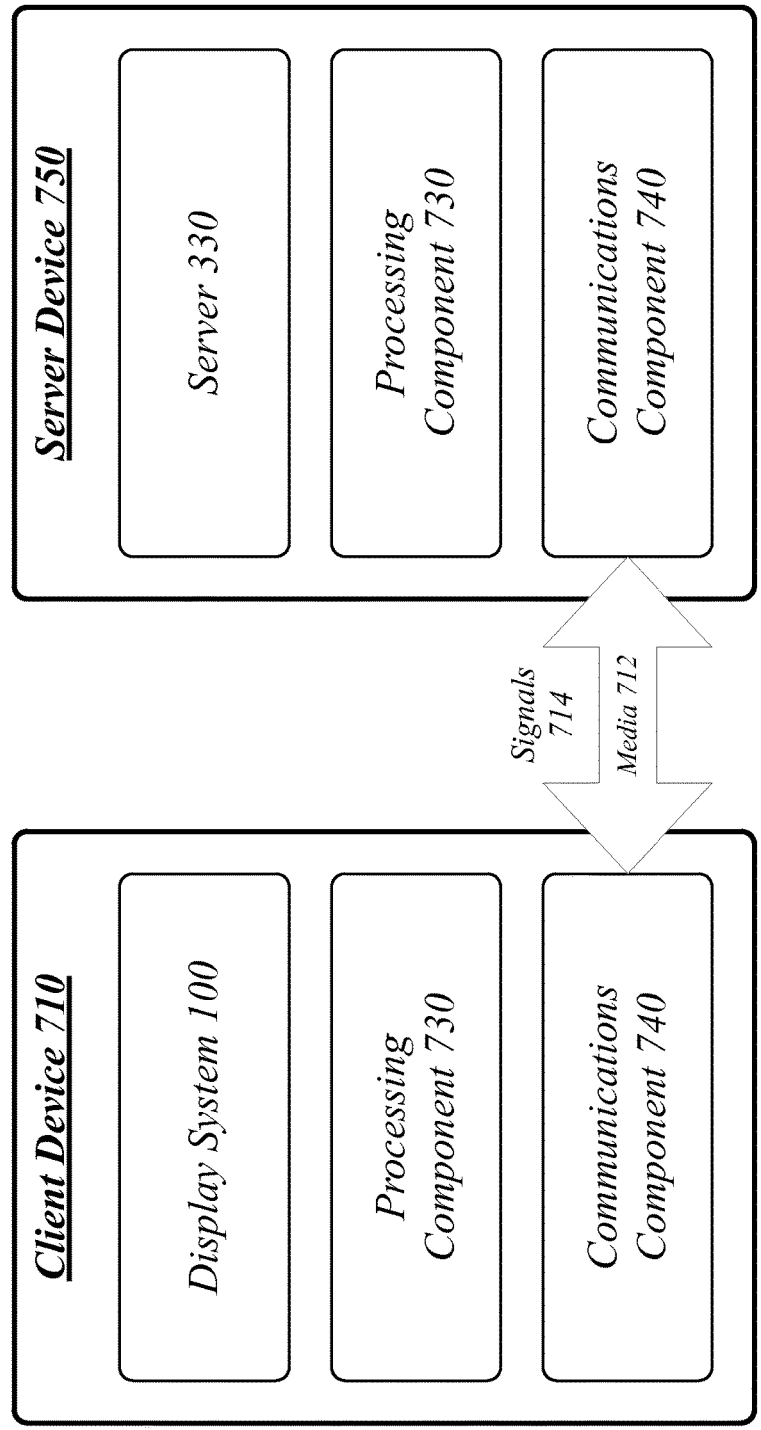
FIG. 7 illustrates an embodiment of a distributed system for the system of FIG. 1.

FIG. 7 illustrates a block diagram of a distributed system 700. The distributed system 700 may distribute portions of the structure and/or operations for the display system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a client device 710 and a server device 750. In general, the client device 710 and the server device 750 may be the same or similar to the client device 620 as described with reference to FIG. 6. For instance, the client system 710 and the server system 750 may each comprise a processing component 730 and a communications component 740 which are the same or similar to the processing component 630 and the communications component 640, respectively, as described with reference to FIG. 6. In another example, the devices 710, 750 may communicate over a communications media 712 using communications signals 714 via the communications components 740.

The client device 710 may comprise or employ one or more client programs that operate to perform various methodologies in accordance with the described embodiments. In one embodiment, for example, the client device 710 may implement display system 100 comprising the layout component 120, the view component 160, the display component 170, the render component 220, and the network component 360.

The server device 750 may comprise or employ one or more server programs that operate to perform various methodologies in accordance with the described embodiments. In one embodiment, for example, the server device 750 may implement the server 330. Signals 714 sent over media 712 may comprise, for example, data bundle 305 being sent from server 330 to display system 100.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 may be operative at block 802 to receive on one or more background threads 110-a a plurality of layout objects 105. Receiving an object on a background thread may comprise any of the known techniques for receiving an object. In some instances, the object may be passed as a parameter of a function call. In other instances, the background thread may be instantiated based on a function call, object, or function call to the object, such that the background thread receives the object as part of its instantiation. In general, receiving an object may comprise any technique through which the background thread has the object or has access to the object.

The layout objects 105 may each be associated with an interface element to be created for display for a user. The layout objects 105 may be created based on a collection of interface elements received from a server 330, such as part of a data bundle 305 from the server 330 encoding the interface elements. The logic flow 800 may be operative to receive the data bundle 305 from the server 330 and to produce the plurality of layout objects 105 based on the data bundle 305, such as by instantiating the plurality of layout objects 105 from a user interface helper library according to objects defined in the data bundle 305.

The logic flow 800 may be operative at block 804 to calculate on one or more background threads 110-a layout parameters 125 for each of the plurality of layout objects 105. Layout parameters 125 may comprise any information relevant to formatting, positioning, sizing, or otherwise displaying the plurality of layout objects 105. Layout parameters 125 may include information that does not directly correspond to a visible property of a layout object, but that instead corresponds to relationships with other layout objects, which may indirectly determine some component of the visible presentation of a layout object. In some embodiments, the layout parameters 125 for a layout object may include a bounding rectangle for the layout object.

The logic flow 800 may be operative at block 806 to instantiate on a main thread 150 a plurality of view objects 165, wherein a view object is created for and associated with each of the plurality of layout objects 105. In some embodiments, each of the plurality of view objects 165 may be an instantiation of one or more classes from an operating system user interface library. In these embodiments, each of the plurality of layout objects 105 may be an instantiation of one or more classes from a user interface helper library, wherein the class from the user interface helper library for a particular layout object is associated with, such as on a one-to-one basis, a class from the operating system user interface library.

The logic flow 800 may be operative at block 808 to create on the main thread 150 a plurality of placeholders 125, wherein a placeholder is displayed for each of the plurality of view objects 165 according to layout parameters 125 of an associated view object. A placeholder may generally correspond to an area on the display reserved for the eventual display of a user interface element. This area may be sized according to a pre-calculated size of the user interface elements. As such, in some embodiments, the logic flow 800 may size a placeholder for a view object according to the bounding rectangle from the layout parameters 125 of the layout object.

In some embodiments, the logic flow 800 may include rendering on one or more background threads 210-b the plurality of view objects 165, and replacing the display of the plurality of placeholders 125 with a display of the plurality of view objects 165 once the plurality of view objects 165 is rendered. For instance, in some cases, a view object may replace its placeholder in the display once the view object is rendered, independent of whether other view objects are rendered. Alternatively, the view objects may replace the placeholders once all of the plurality of view objects 165 has finished rendering.

In some embodiments, the plurality of placeholders 175 may comprise rendered images of a plurality of user interface controls, the plurality of user interface controls corresponding to the plurality of view objects 165. In this case, the logic flow 800 may be operative to calculate recursively the layout parameters 125 for each of the plurality of layout objects 105 according to the hierarchy of layout objects 105.

The embodiments are not limited to this example.

Figure 9:
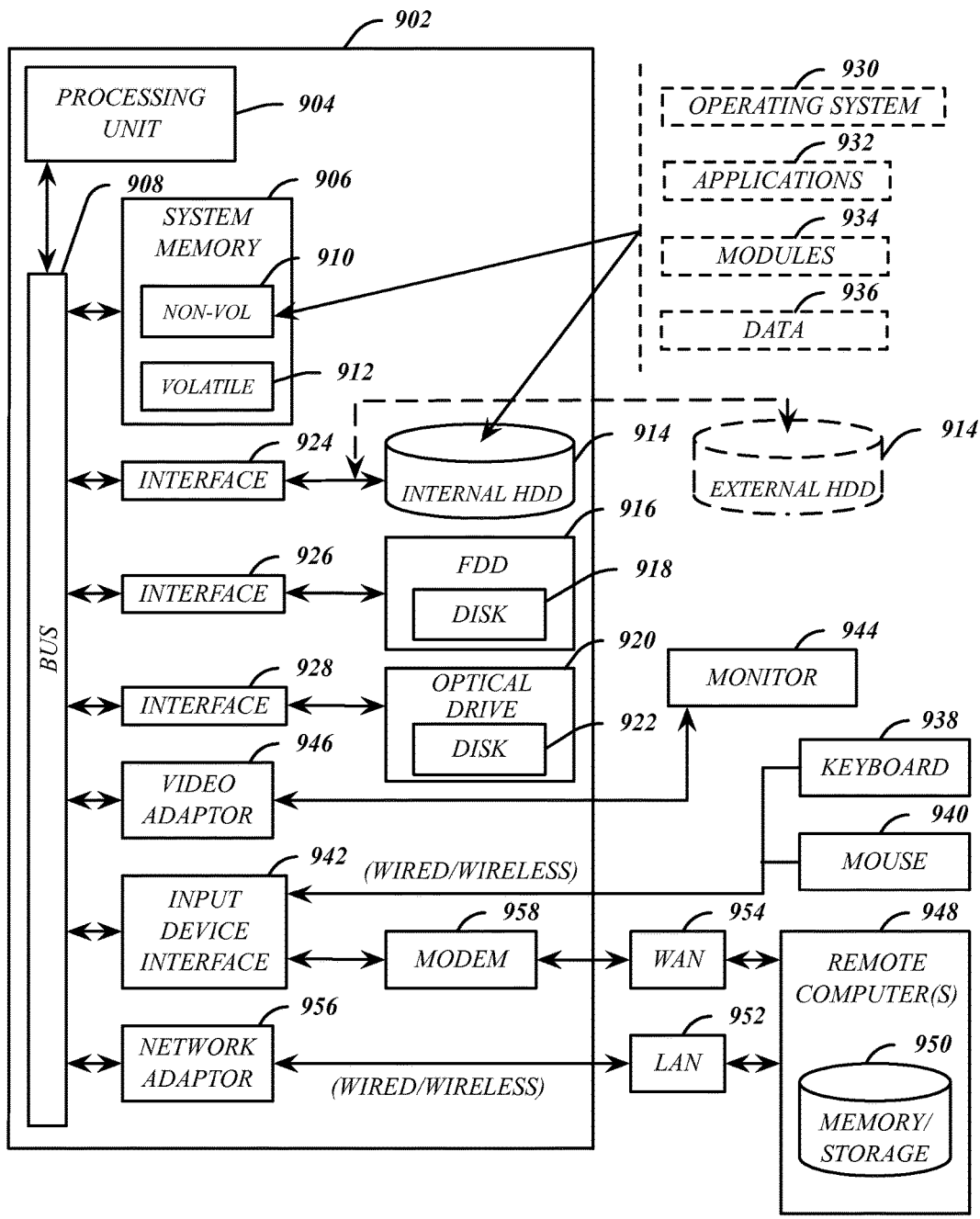
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 6, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the display system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956.

The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
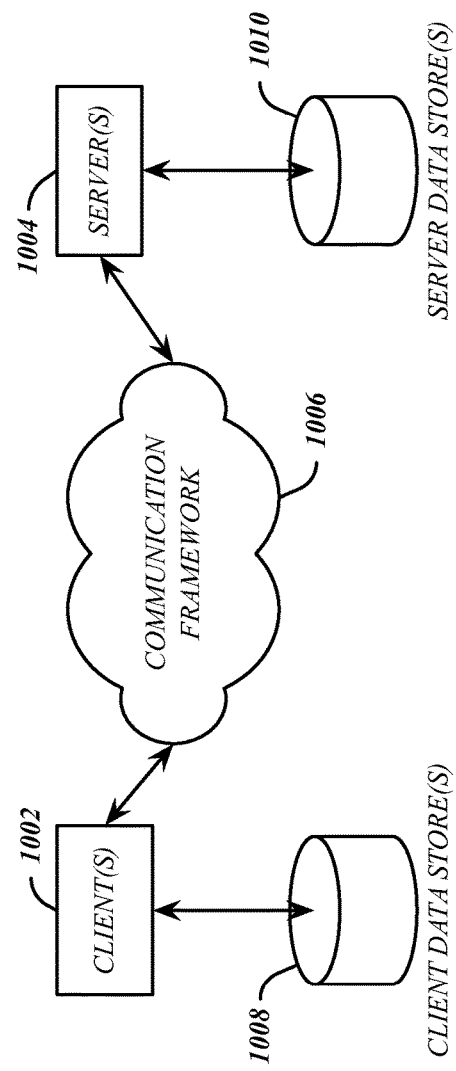
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client device 620 or 710. The servers 1004 may implement the server device 750. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a non-transitory computer readable storage medium storing a user interface library having a plurality of classes corresponding to user interface elements, the user interface library limiting instantiation of objects from the user interface library to a main thread, and a user interface helper library having a plurality of helper classes that correspond on a one-to-one basis with the classes of the user interface library;
a layout component operative on one or more background threads on a processor circuit to receive a plurality of layout objects associated with content for display on a display, the plurality of layout objects comprising instantiations of one or more of the user interface helper classes from the user interface helper library;
and a view component operative on a main thread on the processor circuit to instantiate a plurality of view objects, wherein a view object is created for and associated with each of the plurality of layout objects.

2. The apparatus of claim 1, wherein a helper class from the user interface helper library corresponding to a class from the user interface library is a container class operative to contain an instantiation of a corresponding object from the user interface library.

3. The apparatus of claim 1, wherein a helper object instantiated from one of the helper classes initially contains a non-instantiated variable of a type of a corresponding class from the user interface library.

4. The apparatus of claim 3, the non-instantiated variable configured to store a reference to an object from the user interface library instantiated on the main thread.

5. The apparatus of claim 1, wherein a helper object instantiated from one of the helper classes is configured to store layout information, the view component further configured to use the layout information of the helper object to create a corresponding object from the user interface library.

6. The apparatus of claim 5, wherein the helper object is configured to store the corresponding object created from the user interface library.

7. The apparatus of claim 1, wherein the processor circuit is configured to receive a data bundle including a plurality of objects, each object corresponding to a user interface element for display, and further comprising a network element operative to create a layout object for each object stored in the data bundle.

8. The apparatus of claim 7, the data bundle using a uniform format compatible with multiple platforms, the network element further operative to translate the data bundle into a user interface object structure used by the user interface helper library.

9. A method comprising:
accessing a user interface library having a plurality of classes corresponding to user interface elements, the user interface library limiting instantiation of objects from the user interface library to a main thread;
accessing a user interface helper library having a plurality of helper classes that correspond on a one-to-one basis with the classes of the user interface library;
receiving, using a layout component operative on one or more background threads on a processor circuit, a plurality of layout objects associated with content for display on a display, the plurality of layout objects comprising instantiations of one or more of the user interface helper classes from the user interface helper library;
and instantiating, using a view component operative on a main thread on the processor circuit, a plurality of view objects, wherein a view object is created for and associated with each of the plurality of layout objects.

10. The method of claim 9, wherein a helper class from the user interface helper library corresponding to a class from the user interface library is a container class operative to contain an instantiation of a corresponding object from the user interface library.

11. The method of claim 9, wherein a helper object instantiated from one of the helper classes initially contains a non-instantiated variable of a type of a corresponding class from the user interface library.

12. The method of claim 11, the non-instantiated variable configured to store a reference to an object from the user interface library instantiated on the main thread.

13. The method of claim 9, wherein a helper object instantiated from one of the helper classes is configured to store layout information, the view component further configured to use the layout information of the helper object to create a corresponding object from the user interface library.

14. The method of claim 9, wherein the processor circuit is configured to receive a data bundle including a plurality of objects, each object corresponding to a user interface element for display, and further comprising creating, using a network element, a layout object for each object stored in the data bundle, the data bundle using a uniform format compatible with multiple platforms, and translating, using the network element, the data bundle into a user interface object structure used by the user interface helper library.

15. A non-transitory computer readable medium storing:
a user interface library having a plurality of classes corresponding to user interface elements, the user interface library limiting instantiation of objects from the user interface library to a main thread;
a user interface helper library having a plurality of helper classes that correspond on a one-to-one basis with the classes of the user interface library;
layout logic operative on one or more background threads on a processor circuit configured to receive a plurality of layout objects associated with content for display on a display, the plurality of layout objects comprising instantiations of one or more of the user interface helper classes from the user interface helper library;
and view logic operative on a main thread on the processor circuit configured to instantiate a plurality of view objects, wherein a view object is created for and associated with each of the plurality of layout objects.

16. The medium of claim 15, wherein a helper class from the user interface helper library corresponding to a class from the user interface library is a container class operative to contain an instantiation of a corresponding object from the user interface library.

17. The medium of claim 15, wherein a helper object instantiated from one of the helper classes initially contains a non-instantiated variable of a type of a corresponding class from the user interface library.

18. The medium of claim 17, the non-instantiated variable configured to store a reference to an object from the user interface library instantiated on the main thread.

19. The medium of claim 15, wherein a helper object instantiated from one of the helper classes is configured to store layout information, the view logic further configured to use the layout information of the helper object to create a corresponding object from the user interface library.

20. The medium of claim 15, wherein the processor circuit is configured to receive a data bundle including a plurality of objects, each object corresponding to a user interface element for display, and further comprising network logic configured to create a layout object for each object stored in the data bundle, the data bundle using a uniform format compatible with multiple platforms, and to translate the data bundle into a user interface object structure used by the user interface helper library.

* * * * *